(12) United States Patent
Sedin et al.

(10) Patent No.: US 12,192,837 B2
(45) Date of Patent: Jan. 7, 2025

(54) UE PROCEDURES FOR REDUCING RSRP/RSRQ MEASUREMENT IN RRC IDLE MODE AND INACTIVE STATE

(71) Applicant: Telefonaktiebolaget LM Ericsson (publ), Stockholm (SE)

(72) Inventors: Jonas Sedin, Sollentuna (SE); Sebastian Euler, Storvreta (SE); Xingqin Lin, Santa Clara, CA (US); Helka-Liina Määttänen, Helsinki (FI); Olof Liberg, Enskede (SE); Henrik Rydén, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 572 days.

(21) Appl. No.: 17/422,548

(22) PCT Filed: Nov. 27, 2019

(86) PCT No.: PCT/IB2019/060216
§ 371 (c)(1),
(2) Date: Jul. 13, 2021

(87) PCT Pub. No.: WO2020/148582
PCT Pub. Date: Jul. 23, 2020

(65) Prior Publication Data
US 2022/0104082 A1    Mar. 31, 2022

Related U.S. Application Data

(60) Provisional application No. 62/791,982, filed on Jan. 14, 2019.

(51) Int. Cl.
*H04W 36/00* (2009.01)
*H04W 84/06* (2009.01)

(52) U.S. Cl.
CPC ........ *H04W 36/0085* (2018.08); *H04W 84/06* (2013.01)

(58) Field of Classification Search
CPC ........ H04L 1/1812; H04L 5/00; H04W 72/21; H04W 36/08; H04W 36/00; H04W 36/30
See application file for complete search history.

(56) References Cited

U.S. PATENT DOCUMENTS

2020/0395999 A1* 12/2020 Diaz Sendra ........ H04B 7/2041
2021/0376915 A1* 12/2021 Mahalingam ....... H04W 72/542
2021/0399797 A1* 12/2021 Khan ................. H04B 7/18541

FOREIGN PATENT DOCUMENTS

EP      2632205 A1    8/2013
EP      2 701 420 A1   2/2014
(Continued)

OTHER PUBLICATIONS

International Search Report and Written Opinion issued in International Application No. PCT/IB2019/060216 dated Feb. 27, 2020 (13 pages).
(Continued)

*Primary Examiner* — Iqbal Zaidi
(74) *Attorney, Agent, or Firm* — Rothwell, Figg, Ernst & Manbeck, P.C.

(57) ABSTRACT

Methods performed by base stations and wireless devices for reducing RSRP and/or RSRQ measurements are disclosed. A method performed by a base station comprises indicating to a wireless device whether or not to perform cell selection and/or reselection measurements based on certain criteria. A method performed by a wireless device comprises determining whether or not to perform cell selection and/or reselection measurements based on certain criteria. Also disclosed are base stations and wireless devices configured to perform the methods.

23 Claims, 15 Drawing Sheets

(56) References Cited

FOREIGN PATENT DOCUMENTS

| JP | 2019-500805 A | 1/2019 |
|----|---------------|--------|
| WO | 2016/183025 A1 | 11/2016 |
| WO | 2017/059894 A1 | 4/2017 |
| WO | 2017/113107 A1 | 7/2017 |

OTHER PUBLICATIONS

ZTE Corporation et al., "Consideration on the cell definition and NTN mobility", 3GPP TSG-RAN WG2 Meeting#104, R2-1817062, Spokane, USA, Nov. 12-16, 2018 (13 pages).

Thales, "Study on solutions evaluation for NR to support Non Terrestrial Network", 3GPP TSG RAN meeting #80, RP-181370, La Jolla, USA, Jun. 11-14, 2018 (5 pages).

3GPP TR 38.811 V15.2.0 (Sep. 2019), 3rd Generation Partnership Project; Technical Specification Group Radio Access Network; Study on New Radio (NR) to support non-terrestrial networks (Release 15) Sep. 2019 (126 pages).

ETSI TS 136 304 V15.2.0 (3GPP TS 36.304 V15.2.0) (Apr. 2019), Technical Specification, LTE; Evolved Universal Terrestrial Radio Access (E-UTRA); User Equipment (UE) procedures in idle mode (3GPP TS 36.304 version 15.2.0 Release 15) Apr. 2019 (57 pages).

Sony, "Consideration on mobility impacts of NTN support in NR", 3GPP TSG RAN WG2 Meeting #104, R2-1817079, Spokane, USA, Nov. 12-16, 2018 (2 pages).

Huawei et al., "Considerations on NTN impact on cell selection and MSE", 3GPP TSG-RAN WG2 Meeting #104, R2-1818249, Spokane, US, Nov. 12-16, 2018 (2 pages).

CATT, "Considerations on NTN mobility", 3GPP TSG-RAN WG3 #102, R3-186368, Spokane, WA, USA, Nov. 12-16, 2018 (5 pages).

Ericsson, "Late cell reselection in NB-IoT", 3GPP TSG-RAN2 Meeting #98, R2-1705036, Hangzhou, China, May 15-19, 2017 (3 pages).

Nokia et al., "Further coniderations on Mobility impacts for LEO based networks", 3GPP TSG-RAN WG2 Meeting #104, R2-1818376, Spokane, USA, Nov. 12-16, 2018 (3 pages).

Thales, "NTN mobility management principles", 3GPP TSG RAN WG3 Meeting #101bis, R3-186203, Chengdu/China, Oct. 8-12, 2018 (3 pages).

Ericsson, "Spot beam versus cell in NTN NR", 3GPP TSG-RAN WG2 #103bis, Tdoc R2-1814931, Chengdu, China, Oct. 8-12, 2018 (6 pages).

* cited by examiner

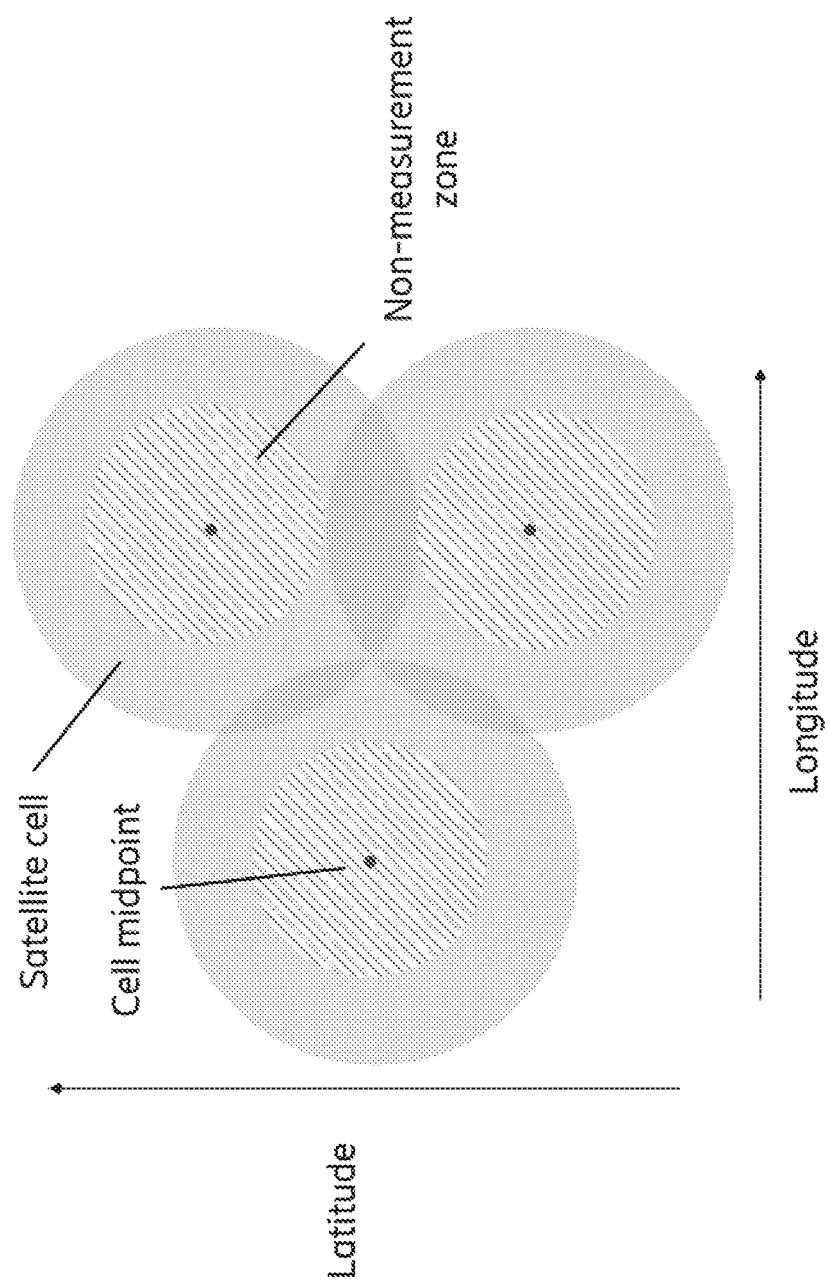

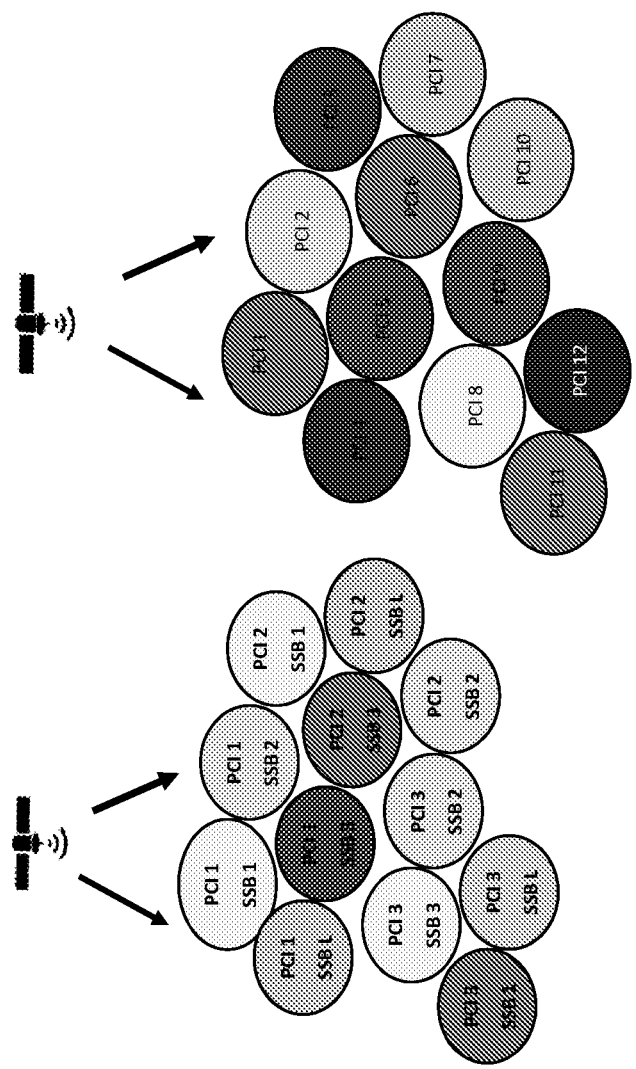

UE PROCEDURES FOR REDUCING RSRP/RSRQ MEASUREMENT IN RRC IDLE MODE AND INACTIVE STATE

CROSS REFERENCE TO RELATED APPLICATIONS

This application is a 35 U.S.C. § 371 National Stage of International Patent Application No. PCT/IB2019/060216, filed Nov. 27, 2019, designating the United States and claiming priority to U.S. Provisional Patent Application No. 62/791,982, filed Jan. 14, 2019, which is incorporated by this reference herein in its entirety.

TECHNICAL FIELD

Embodiments of the present disclosure relate to methods and apparatus in networks, and particularly wireless devices, base stations and methods in wireless devices and base stations for reducing RSRP and/or RSRQ measurements.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

There is an ongoing resurgence of satellite communications. Several plans for satellite networks have been announced in the past few years. The target services vary, from backhaul and fixed wireless, to transportation, to outdoor mobile, to IoT. Satellite networks could complement mobile networks on the ground by providing connectivity to underserved areas and multicast/broadcast services.

To benefit from the strong mobile ecosystem and economy of scale, adapting the terrestrial wireless access technologies including LTE and NR for satellite networks is drawing significant interest. For example, 3GPP completed an initial study in Release 15 on adapting NR to support non-terrestrial networks (mainly satellite networks). This initial study focused on the channel model for the non-terrestrial networks, defining deployment scenarios, and identifying the key potential impacts. 3GPP is conducting a follow-up study item in Release 16 on solutions evaluation for NR to support non-terrestrial networks.

Depending on the orbit altitude, a satellite may be categorized as a Low Earth Orbit (LEO) Medium Earth Orbit (MEO), or Geostationary Orbit (GEO) satellite.

LEO: typical heights ranging from 500-1,500 km, with orbital periods ranging from 90-130 minutes.

MEO: typical heights ranging from 5,000-25,000 km, with orbital periods ranging from 2-14 hours.

GEO: height at 35,786 km, with an orbital period of 24 hours.

A satellite typically generates several beams over a given area. The footprint of a beam is usually in an elliptic shape, which has been traditionally considered as a cell. The footprint of a beam is also often referred to as a spotbeam. The footprint of a spotbeam may move over the earth surface with the satellite movement or may be earth fixed with some beam pointing mechanism used by the satellite to compensate for its motion. The size of a spotbeam depends on the system design, which may range from tens of kilometers to a few thousands of kilometers.

FIG. 1 shows an example architecture of a satellite network with bent pipe transponders. The access link denotes the link between UE and satellite, the feeder link denotes the satellite and ground base station link.

The objectives of the current 3GPP NTN SI are to evaluate solutions for the identified key impacts from the preceding SI and to study impact on RAN protocols/architecture. The objectives for layer 2 and above are:

---

Study the following aspects and identify related solutions if needed: Propagation delay: Identify timing requirements and solutions on layer 2 aspects, MAC, RLC, RRC, to support non-terrestrial network propagation delays considering FDD and TDD duplexing mode. This includes radio link management. [RAN2]
Handover: Study and identify mobility requirements and necessary measurements that may be needed for handovers between some non-terrestrial space-borne vehicles (such as Non Geo stationary satellites) that move at much higher speed but over predictable paths [RAN2, RAN1]
Architecture: Identify needs for the 5G's Radio Access Network architecture to support non-terrestrial networks (e.g. handling of network identities) [RAN3]
Paging: procedure adaptations in case of moving satellite foot prints or cells Note:
This new study item does not address regulatory issues.

---

The coverage pattern of NTN is described in TR 38.811 in Section 4.6 as follows:

Satellite or aerial vehicles typically generate several beams over a given area. The foot print of the beams is typically elliptic shape.

The beam footprint may be moving over the earth with the satellite or the aerial vehicle motion on its orbit. Alternatively, the beam foot print may be earth fixed, in such case some beam pointing mechanisms (mechanical or electronic steering feature) will compensate for the satellite or the aerial vehicle motion.

TABLE 4.6-1

Typical beam foot print size

| Attributes | GEO | Non-GEO | Aerial |
|---|---|---|---|
| Beam foot print size in diameter | 200-1000 km | 100-500 km | 5-200 km |

Typical beam patterns of various NTN access networks are depicted in FIG. 2.

Current Idle Mode/RRC Inactive State Procedures

There are 3 processes for NR UE in RRC_IDLE and RRC_INACTIVE state: (1) PLMN selection, (2) cell selection and reselection, and (3) location registration and RAN-based notification area (RNA) update. The RAN update is only applicable for RRC_INACTIVE state, while the rest are applicable to both RRC_IDLE and RRC_INACTIVE.

The overall UE procedures in RRC_IDLE and RRC_INACTIVE state are described as follows. When a UE is switched on
1) NAS selects a PLMN for the UE and may set the associated RAT(s)
   a. If available, NAS can provide a list of equivalent PLMNs for cell (re)selection
2) UE performs cell selection (i.e., camp on the cell) with the following tasks
   a. Search for a suitable cell of the selected PLMN
   b. Choose the cell that provides available services
   c. Monitor the control channel of the cell
3) If necessary, by means of a NAS registration procedure, UE registers its presence in the tracking area of the cell
   a. The selected PLMN becomes the registered PLMN after a successful location registration
4) When camped on a cell, the UE shall regularly search for a better cell according to the cell reselection criteria. If UE finds a more suitable cell according to cell reselection criteria, it camps on the reselected more suitable cell
   a. In RRC_IDLE state, if the new cell does not belong to any tracking area in the list of tracking areas of the UE, UE performs location registration
   b. In RRC_INACTIVE state, if the new cell does not belong to the configured RNA, UE performs RNA update
5) If necessary, UE shall search for PLMNs of higher priority at regular time intervals per NAS procedure
   a. If NAS selects another PLMN, UE shall search for a suitable cell
6) If coverage is lost in the registered PLMN, new PLMN selection can be performed either automatically or manually In RRC_IDLE and RRC_INACTIVE state, UE needs to perform measurements to support PLMN selection, cell selection and reselection as part of Access Stratum procedures, and reports to the Non-Access Stratum. Requirements for measurements are described in TS 38.133.

In GSM, WCDMA, and LTE a UE in RRC Idle mode is expected to perform similar procedures as outlined above for NR.

Current Measurement Rules for Performing Cell Reselection

In current LTE and NR, the UE is expected to regularly perform RSRP/RSRQ measurements for cell reselection purposes in idle mode on inter-frequency and intra-frequency neighbouring cells. There is however a set of exceptions to these rules which are based on whether the signal strength/quality of the current cell is above certain thresholds, which is generally as below:
the cell selection RX level value (related to RSRP measurements) Srxlev>ThresholdP
the cell selection quality value (related to RSRQ measurements) Squal>ThresholdQ If these are fulfilled the UE may choose not to perform intra-frequency, or inter-frequency, measurements whichever applies. The thresholds for RX level and quality value depend on whether the UE is measuring on inter or intra-frequency cells. For intra-frequency the RX level threshold is s-IntraSearchP, which ranges from 0 to 62 dB at the step size of 2 dB and the quality value threshold is s-IntraSearchQ range from 0 to 31 dB at the step size of 1 dB. For inter-frequency the RX level threshold is s-NonIntraSearchP, which ranges from 0 to 62 dB at the step size of 2 dB. The values of s-NonIntraSearchQ range from 0 to 31 dB at the step size of 1 dB.

For NB-IoT the RX level condition is only needed to be met.

These rules are for LTE in detail presented in TS 36.304 section 5.2.4.2 and 5.2.4.2a.

In addition for LTE measurements rules for further relaxed monitoring is specified in TS 36.304 section 5.2.4.12. According to these rules a device may refrain from performing neighbor cell measurements for up to 24 hours in case the most recent measurement of the camped on cell signal strength Srxlev is within a threshold $S_{SearchDeltaP}$ from a reference value $Srxlev_{Ref}$.

There currently exist certain challenges. Existing idle mode procedures would require the UE to perform cell reselection measurements that are unnecessary given that the satellite radio propagation environment is much more predictive compared to the terrestrial case. As mentioned above, the UE would typically be required to measure neighbor cells at all times, which would not be necessary in the satellite scenario. In FIG. 2 the cells in a satellite network can be seen and in FIG. 2 the RSRP can also be seen. In this case the serving cell will have the strongest power in a very large area of several 10s of kilometers from the center of the cell and for many satellite UEs the UE would only be served by one beam during its whole life-span, making neighbor cell measurements unnecessary.

The current rules for relaxing the measurements, which are based on signal strength, are also not suitable for satellite systems due to the small difference in signal strength across neighboring cells as shown in FIG. 3.

[1] Tdoc R2-1814931 Spot beam versus cell in NTN NR, by Ericsson, 3GPP TSG-RAN WG2 #103bis, 8-12 Oct. 2018, available at https://www.3gpp.org/DynaReport/TDocExMtg-R2-103b-18803.htm as of 6 Oct. 2019, considers relations between NR cells and satellite spot beams.

[2] R3-186203 NTN mobility management principles, by Thales, 3GPP TSG-RAN WG3 #101bis, 8-12 Oct. 2018, available at as of 6 Oct. 2019, provides proposals on mobility management aspects related to Non-Terrestrial networks. https://www.3gpp.org/ftp/tsg_ran/WG3_Iu/TSGR3_101bis/Docs/

[3] R3-186269 TR Solutions for NR to support non-terrestrial networks (NTN), RAN3, available at https://portal.3gpp.org/ngppapp/CreateTdoc.aspx?mode=view&contributionUid=R3-186269# as of 6 Oct. 2019 considers support in NR for non-terrestrial networks.

[4] TS 36.304 v 15.1.0 considers Evolved Universal Terrestrial Radio Access (E-UTRA); User Equipment (UE) procedures in idle mode.

[5] TS 38.133 v 15.3.0 considers the requirements for support of radio resource management in NR
[6] TR 38.811 v 15.0.0 considers support of NR for non terrestrial networks.

SUMMARY

It is an object of the present disclosure to reduce one or both of the frequency and scope of RSRP and/or RSRQ measurements by wireless devices, thereby reducing the load on wireless device power sources that may be caused by repeated RSRP and/or RSRQ measurements.

Embodiments of the disclosure aim to provide apparatus and methods that alleviate some or all of the issues identified.

An aspect of an embodiment of the disclosure provides a method performed by a wireless device for reducing Reference Signal Received Power, RSRP, and/or Reference Signal Received Quality, RSRQ, measurements, the method comprising determining whether or not to perform cell selection and/or reselection measurements based on certain criteria, wherein at least one of the cells for which the wireless device may perform cell selection or reselection measurements is a spotbeam generated by a satellite.

An aspect of an embodiment of the disclosure provides a method performed by a base station for reducing Reference Signal Received Power, RSRP and/or Reference Signal Received Quality, RSRQ, measurements, the method comprising indicating to a wireless device whether or not to perform cell selection and/or reselection measurements based on certain criteria, wherein at least one of the cells for which the wireless device may perform cell selection or reselection measurements is a spotbeam generated by a satellite.

Further aspects of embodiments provide wireless devices and base stations configured to perform the methods for reducing Reference Signal Received Power, RSRP and/or Reference Signal Received Quality, RSRQ, measurements.

BRIEF DESCRIPTION OF DRAWINGS

For a better understanding of the present disclosure, and to show how it may be put into effect, reference will now be made, by way of example only, to the accompanying drawings, in which:

FIG. 4 is a schematic diagram illustrating non-measurement zones for cells in accordance with an aspect of an embodiment;

FIGS. 6A and 6B are schematic diagrams show options for cell and SSB beam versus satellite beam configurations;

DETAILED DESCRIPTION

Figure 1:
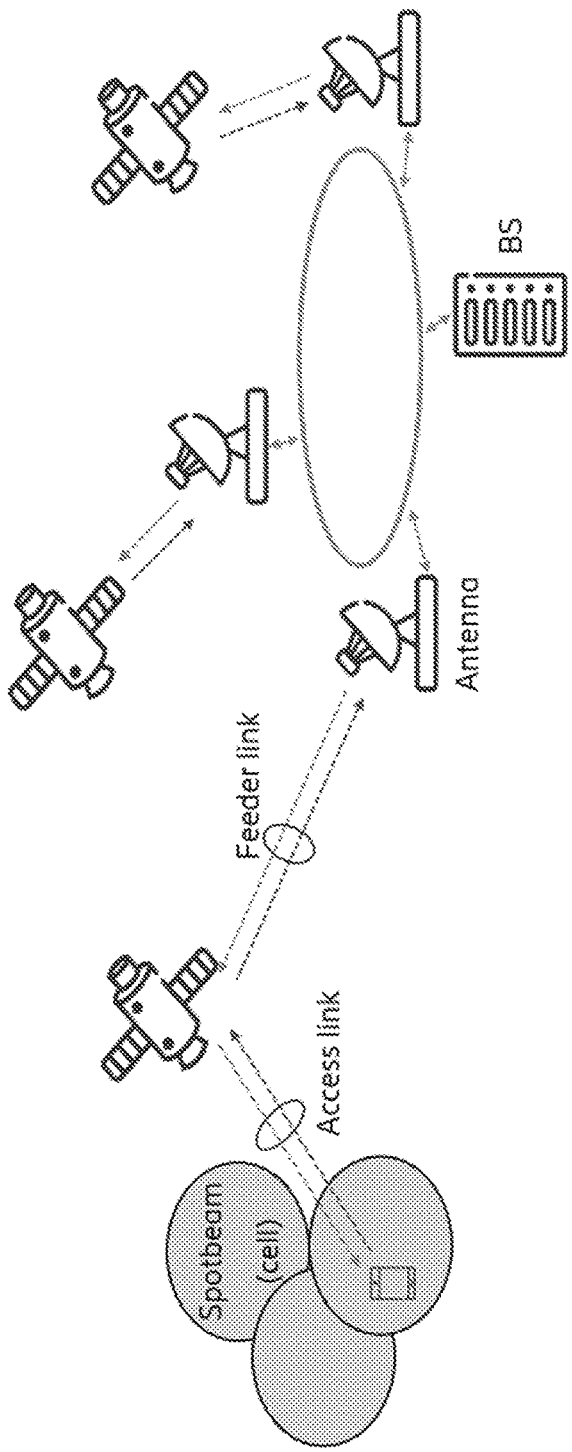
FIG. 1 is a schematic diagram of an example architecture of a satellite network with bent pipe transponders.
Figure 2:
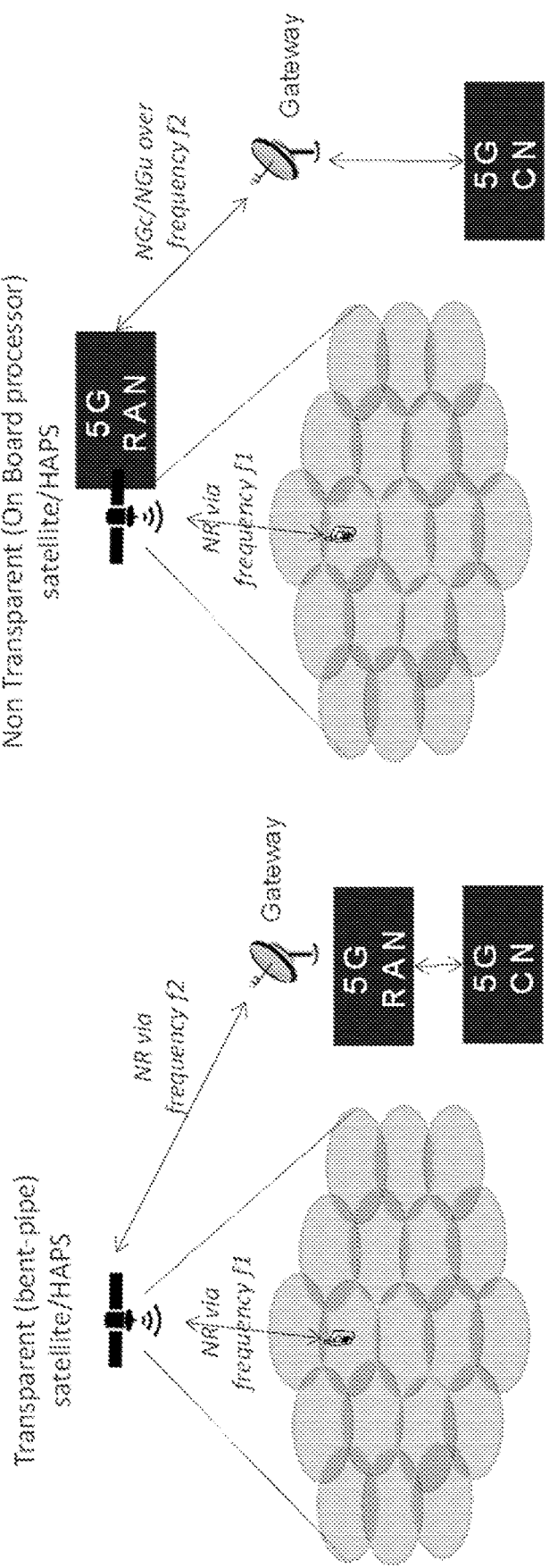
FIG. 2 is a schematic diagram showing examples of NTN beam patterns.
Figure 3:
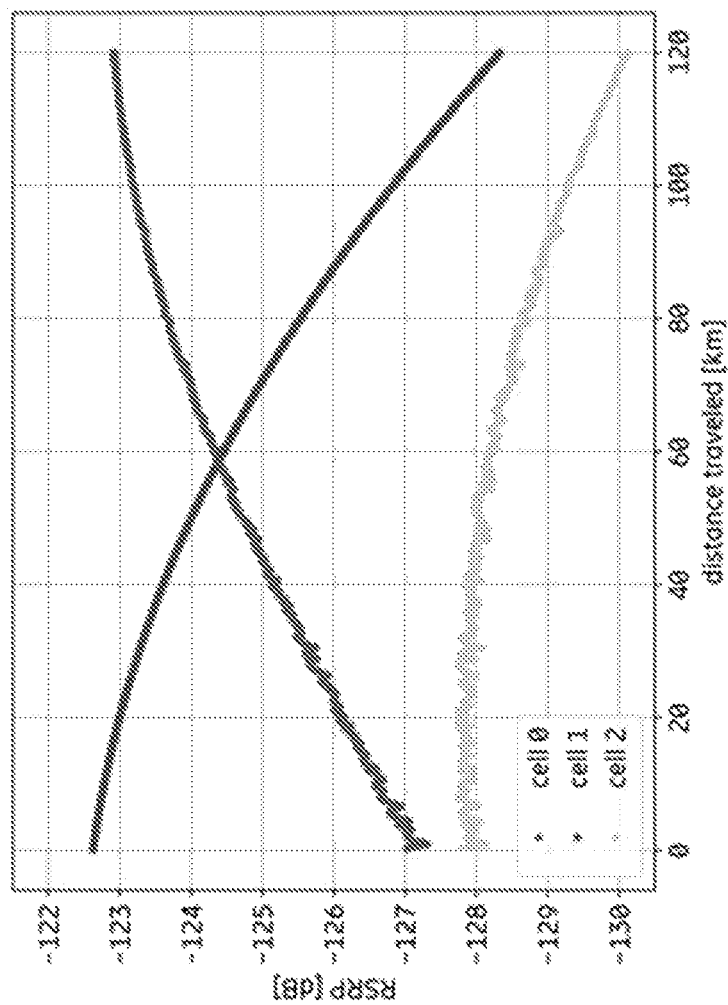
FIG. 3 is a plot displaying the relationship between RSRP versus distance moving from one GEO satellite cell to another.

Certain aspects of the present disclosure and their embodiments may provide solutions to these or other challenges. According to certain embodiments, the proposed solution introduces methods based on GNSS positioning for disabling RSRP and/or RSRQ measurements on serving and neighbouring cells. This may reduce the amount of required measurements for cell reselection by defining areas where measurements where neighbouring cell and frequency measurements are not required.

There are, proposed herein, various embodiments which address one or more of the issues disclosed herein. These include methods performed by UEs and network nodes operating in a wireless communication network. Additionally, the embodiments include a UE comprising appropriate hardware (e.g., processing circuitry) configured to perform the aforementioned methods. Additionally, the embodiments include a network node comprising appropriate hardware (e.g., processing circuitry) configured to perform the aforementioned methods. These methods and apparatuses are described in more detail throughout this disclosure.

Certain embodiments may provide one or more of the following technical advantages. A UE equipped with GNSS, or similar functionality, is expected to regularly perform measurements of its geographical position, which may use this location information to reduce its RSRP and RSRQ measurements frequency to decrease the UE power consumptions. This may also reduce the amount of required measurements for cell reselection by defining areas where measurements where neighbouring cell and frequency measurements are not required. These and other technical advantages will be readily apparent to one of skill in the art in light of the present disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Additional information may also be found in the draft discussion document provided in the Appendix.

The below embodiments may be implemented either through NAS (23.122) and/or AS (36.304/38.304/36.133/38.133/36.331/38.331) procedures. The below embodiments also mostly assume that the UE is equipped with GNSS receiver or other type of positioning abilities. Although the embodiments are enumerated, it should be appreciated that the various embodiments may be combined in any suitable fashion without departing from the scope of this disclosure.

Embodiment 1—Non-Measurement Zones

Basic idea: In this embodiment, the GSM/WCDMA/LTE/NR network can configure a GNSS-based zone wherein the UE is not required to measure RSRP and/or RSRQ of serving and/or neighboring cells or frequencies for cell selection and cell reselection purposes. Once outside of the configured non-measurement zone, the UE will start measuring on serving and neighboring cells or frequencies.

Example: The network configures a zone at the midpoint of the satellite beam with a radius of X distance. When leaving the zone, the UE once again performs the cell selection and reselection measurements.

The network can configure the zones using format in 23.032, for example using the ellipsoid point with uncertainty circle, where the uncertainty circle radius r configures the size of the non-measurement zone. The UE will therefore not measure when inside the measurement uncertainty circle of the ellipsoid point. FIG. 4 shows an example of non-measurement zones for cells in accordance with an aspect of an embodiment.

In another embodiment, one non-measurement zone is described by the Ellipsoid point with uncertainty ellipse (§ 5.3 in 23.032), or the polygon in (§ 5.4 in 23.032).

Embodiment 2—Intra-Frequency Measurement Rules for Cell Reselection

Basic idea: Using the cell reselection relaxation rules in this embodiment, a set of s-IntraSearchP values and s-IntraSearchQ values are configured for specific areas, and UE determines the s-IntraSearchP value and s-IntraSearchQ value to use for deciding whether serving cell and non-serving cell intra-frequency measurements shall be performed or not.

Example: A reference point and a set of thresholds $d_0, \ldots, d_{N-1}$ are configured. A set of s-IntraSearchP values s-IntraSearchP$_0$, ..., s-IntraSearchP$_N$ and a set of s-IntraSearchQ values s-IntraSearchQ$_0$, ..., s-IntraSearchQ$_N$ are configured.

UE determines its class by checking its distance d to the reference point.

UE is in class 0 if its distance $d<d_0$

UE is in class 1 if its distance satisfies that $d_0 \leq d < d_1$

UE is in class n if its distance satisfies that $d_{n-1} \leq d < d_n$, n=1, ..., N-1

UE is in class N if its distance $d \geq d_{N-1}$

For UE in class 0 neither serving nor non-serving cell RSRP/RSRQ intra-frequency measurements are performed. Or they are performed with a reduced periodicity.

For UE in class n, n=1, ..., N, the UE uses s-IntraSearchP$_n$ and s-IntraSearchQ$_n$ for deciding whether intra-frequency measurements shall be performed or not. Specifically, if the serving cell fulfils that:

the cell selection RX level value (related to RSRP measurements) Srxlev>s-IntraSearchPn the cell selection quality value (related to RSRQ measurements) Squal>s-IntraSearchQn the UE may choose not to perform intra-frequency measurements. Otherwise, the UE shall perform intra-frequency measurements.

The value ranges of s-IntraSearchP and s-IntraSearchQ are extended to include negative values and negative infinity.

To illustrate how the above method can help limit UE measurements for cell reselection, consider the case with N=1. In this case, there are 2 UE classes: UE is in class 0 if its distance $d<d_0$ and is in class 1 otherwise. The s-IntraSearchP$_0$ and s-IntraSearchQ$_0$ may be both set to negative infinity. Then Srxlev>s-IntraSearchP$_0$=-∞ and Squal>s-IntraSearchQ$_0$=-∞. As a result, UE in class 0 does not need to perform intra-frequency measurements.

Alternatively, the UE and/or network uses the UE distances d, and the above list of distance thresholds $d_0, \ldots, d_{N-1}$ for determining the value of the threshold $S_{SearchDeltaP}$ for relaxing non-serving cell intra-frequency measurements. For a UE close to the cell center a higher tolerance, i.e. large $S_{SearchDeltaP}$ is acceptable. As the UE approaches the outskirts of the cell a lower tolerance is relevant.

Embodiment 3—Inter-Frequency Measurement Rules for Cell Reselection

Basic idea: Based on the measurement relaxation rules, in this embodiment, a set of s-NonIntraSearchP values and s-NonIntraSearchQ values are configured per area, and UE determines the s-NonIntraSearchP value and s-NonIntraSearchQ value to use for deciding whether measurements of LTE/NR inter-frequencies or inter-RAT frequency cells of equal or lower priority shall be performed or not.

Example: A reference point and a set of thresholds $d_0, \ldots, d_{N-1}$ are configured. A set of s-NonIntraSearchP values s-NonIntraSearchP$_0$, ..., s-NonIntraSearchP$_N$ and a set of s-NonIntraSearchQ values s-NonIntraSearchQ$_0$, ..., s-NonIntraSearchQ$_N$ are configured.

UE determines its class by checking its distance d to the reference point.

UE is in class 0 if its distance $d<d_0$

UE is in class n if its distance satisfies that $d_{n-1} \leq d < d_n$, n=1, ..., N-1

UE is in class N if its distance $d \geq d_{N-1}$

For UE in class n, n=0, ..., N, the UE uses s-NonIntraSearchP$_n$ and s-NonIntraSearchQ$_n$ for deciding whether measurements of NR inter-frequencies or inter-RAT frequency cells of equal or lower priority shall be performed or not. Specifically, if the serving cell fulfils that the cell selection RX level value (related to RSRP measurements) Srxlev>s-NonIntraSearchPn the cell selection quality value (related to RSRQ measurements) Squal>s-NonIntraSearchQn the UE may choose not to perform measurements of NR inter-frequencies or inter-RAT frequency cells of equal or lower priority. Otherwise, the UE shall perform measurements of NR inter-frequencies or inter-RAT frequency cells of equal or lower priority.

The value ranges of s-IntraSearchP and s-IntraSearchQ are extended to include negative values and negative infinity.

To illustrate how the above method can help limit UE measurements for cell reselection, consider the case with N=1. In this case, there are 2 UE classes: UE is in class 0 if its distance $d<d_0$ and is in class 1 otherwise. The s-IntraSearchP$_0$ and s-IntraSearchQ$_0$ may be both set to negative infinity. Then Srxlev>s-IntraSearchP$_0$=-∞ and Squal>s-IntraSearchQ$_0$=-∞. As a result, UE in class 0 does not need to perform measurements of NR inter-frequencies or inter-RAT frequency cells of equal or lower priority.

Alternatively, the UE and/or network uses the UE distances d, and the above list of distance thresholds $d_0, \ldots, d_{N-1}$ for determining the value of the threshold $S_{SearchDeltaP}$ for relaxing non-serving cell inter-frequency and/or inter-RAT measurements. For a UE close to the cell center a higher tolerance, i.e. large $S_{SearchDeltaP}$ is acceptable. As the UE approaches the outskirts of the cell a lower tolerance is relevant.

Embodiment 4

Basic idea: The network informs the UE to limit its RSRP/RSRQ measurement activity for the purpose of cell (re)selection to a set of cells N that are closest in geographical distance to the U E.

Embodiment 5

Basic idea: The UE RSRP/RSRQ measurement periodicity for the purpose of cell (re)selection is coupled to the geographical distance between a UE and a cell. More frequent RSRP/RSRQ measurements are performed on cell closer in distance to the UE, while less frequent measurements are performed on cells far from the UE.

Embodiment 6

How to indicate the zone on which no measurements are done:
RRC
    As mentioned in embodiment 1 the area of the cell might have been configured and through RRC area might be defined as a reference point p which is the middle of the area and a radius to the midpoint r, which defines a circle.
MAC CE
RRC+RNTI to activate/deactivate,
DCI
NAS Embodiment 7

Basic Idea: In the scenario with LEO satellites and earth-moving beams, the UE is configured with reference location(s) that are changing with time. The UE is configured with one or more moving reference locations as a sub-embodiment to embodiment 2 or moving ellipsoid points as in embodiment 1.

Example: The UE follows the described procedure in embodiments above but updates the reference location(s) based on, for example, one of the GNSS time references. The time-dependent reference locations can be reported as a list where each list-item is valid for a certain time duration.

Figures 5A, 5B:
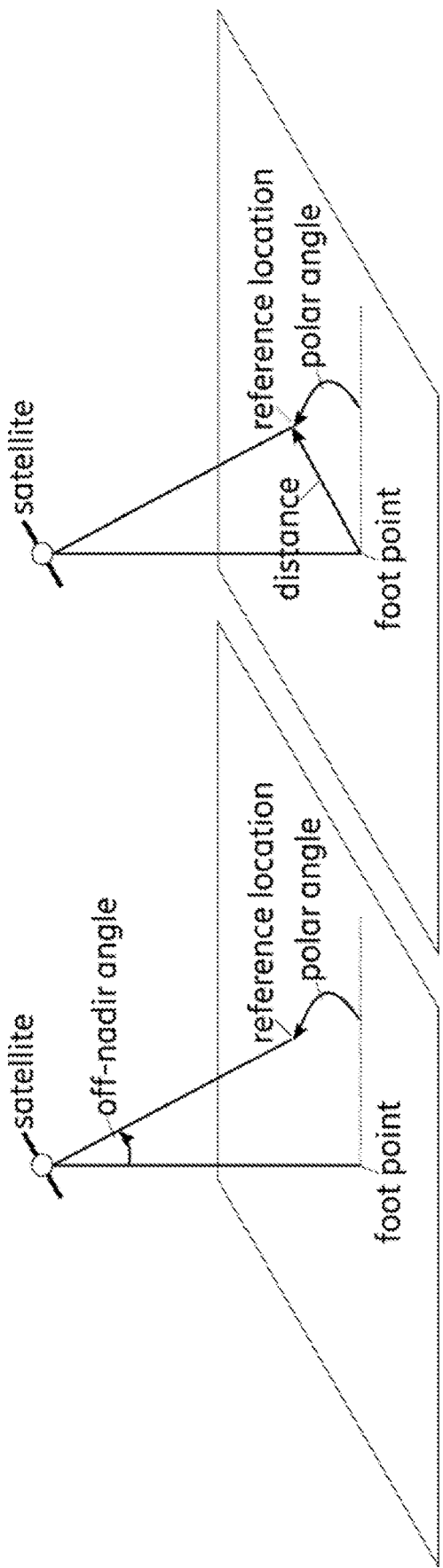
FIGS. 5A and 5B are schematic diagrams indicating how the reference location may be defined relative to satellite position or satellite foot point.

In another embodiment, the reference location is defined relative to the satellite position, e.g. by off-nadir angle and polar angle (see FIG. 5A). The satellite position at any given time can be calculated from ephemeris data, which can be provided to the UE by the network, e.g. in form of Two-Line Elements (TLE). In this embodiment, at any given time instance, the UE calculates the current position of the satellite from the ephemeris data. Then it finds the reference location and constructs the non-measurement zones from that. Finally, it checks its own position, and if it is still inside the non-measurement zone.

Yet another embodiment is the same as above, but the reference location is defined relative to the satellite foot point, e.g. by a polar angle and a distance (see FIG. 5B). In addition to the procedure described above, after calculating the satellite position, the UE calculates the foot point location from the satellite position.

The following paragraph considers terminology and definitions for NR NTN SI. Satellite beams, satellites or satellite cells are not considered to be visible from UE perspective in NTN SI. This does not preclude differentiating at the PLMN level the type of network (e.g. NTN vs. terrestrial).

Association between NR PCI and NR SSBs is left for implementation.

Both option a and b (as shown in FIGS. 6A and 6B respectively) can be considered in NTN SI with one or multiple SSBs per PCI. The TR will capture a figure for both option.

The tables below contain key issues to address for mobility. Aspects of embodiments may address one or more of the issues set out in the tables.

2.1 GEO NTN Transparent Payload
Q1: Identify Key Issues to Address for Mobility from Measurement (RRM) Perspective for GEO Scenario?

| Company | Proposals | Comments |
|---|---|---|
| Nokia | Impact of large propagation delays.<br>Beam/cell measurements periodicity and configuration options.<br>Impact of UE measurement accuracy and model (RSRP/RSRQ errors) in combination with large propagation delays. | Particular settings/configuration needed taking in account the large propagation delays. |
| Huawei, HiSilicon | Measurement periodicity and configuration optimization | The radio channel state keeps stable for UE, especially for low speed UE, so the corresponding measurement actions can be less frequent to save UE power. |
| Ericsson | To identify satellite specific information needed to be provided to the UE in a measurement configuration.<br>To identify if new event based/periodical measurement are | We would need to identify the issues we can discuss in RAN2 and what is e.g. RAN4 territory.<br>Further, we should take into account ongoing positioning work as well as UE power saving work. |

-continued

| Company | Proposals | Comments |
|---------|-----------|----------|
| | needed. This could involve event based location reporting. As GEO cell size is very large, to study whether it is up to network to configure measurements only when UE is as cell boarder or how UE power consumption could be reduced. Report size should be considered for both location and RSRP/RSRQ reporting. | |

Q2: Identify Key Issues to Address for Mobility from HO Signalling/Procedure Perspective for GEO Scenario?

| Company | | Proposals/Comments |
|---------|---|--------------------|
| Nokia | Yes | Proactive triggering (based on satellite ephemeris) and event(s) configuration considering large delays due to bent-pipe. Only scenarios with UEs at the border of GEO footprint are affected. |
| Huawei, HiSilicon | Yes | Long handover interruption time due to large RTT. Average handover interruption time is about 50 ms for terrestrial network, but it may reach to 500 ms for NTN considering much longer random access procedure |
| Ericsson | | Study the effect of delay in the signalling, does it affect RLF and HOF? Are the related timer values enough? Study interruption time due to high RTT values. Idle mode mobility should be studied if enhancements are needed. |

2.1 LEO NTN with Transparent or Regenerative Payload and Moving Beams?

Q1: Identify Key Issues to Address for Mobility from Measurement (RRM) Perspective for LEO Scenario?

| Company | Proposals | Comments |
|---------|-----------|----------|
| Nokia | Impact of large propagation delays. Beam/cell measurements periodicity and configuration options. Impact UE measurement accuracy and model (RSRP/RSRQ errors) in combination with large propagation delays. Using satellite ephemeris information and UE position/location information. | Particular settings/configuration needed taking in account the large propagation delays and relative satellite-UE movements. |
| Huawei, HiSilicon | Measurement configuration optimization | Frequent serving satellite update leads to frequent cell change for measurement, which involves frequent measurement configuration update. For example, each satellite may configure a different cell list for measurement from last serving satellite. |
| Ericsson | To identify satellite specific information needed to be provided to the UE in a measurement configuration. To identify if new event based/periodical measurement are needed. Or, if reporting could be limited. | As nonGEO satellites are moving, does UE need to be informed about target cell/freq movement? Does feeder link switch of target cell affect the cell RS UE is measuring from target cell? For bent-pipe, there may be a new SSB(PCI) sent via the transparent satellite. For regenerative, it depends on architecture option and design whether PCI stays the same or is changed when feeder link changes. |

Q2: Identify Key Issues to Address for Mobility from HO Signalling/Procedure Perspective for LEO Scenario?

| Company | Answer(Yes/No) | Proposals/Comments |
|---|---|---|
| Nokia | Yes | Proactive (based on satellite ephemeris) and reactive HO triggering and event(s) configuration considering delay and fast cell changes, stationary or fast moving UEs. Critical UE-satellite mobility scenarios can be identified beforehand and only those are to be evaluated. |
| Huawei, HiSilicon | Yes | In LEO scenario, handover occurs more frequently than terrestrial scenario, so it can lead to large Signalling overhead and large ratio of interruption time. |
| Ericsson | | Study whether conditional mobility is needed for LEO satellite.<br>Futher, what happens when feeder link changes of UEs SpCell? Is the connection lost?<br>Idle mode mobility should be studied if enhancements are needed. |

The various embodiments have been described in terms of UEs, network nodes, and other devices operating in a wireless network. These devices and networks will now be described in more detail.

Figure 7:
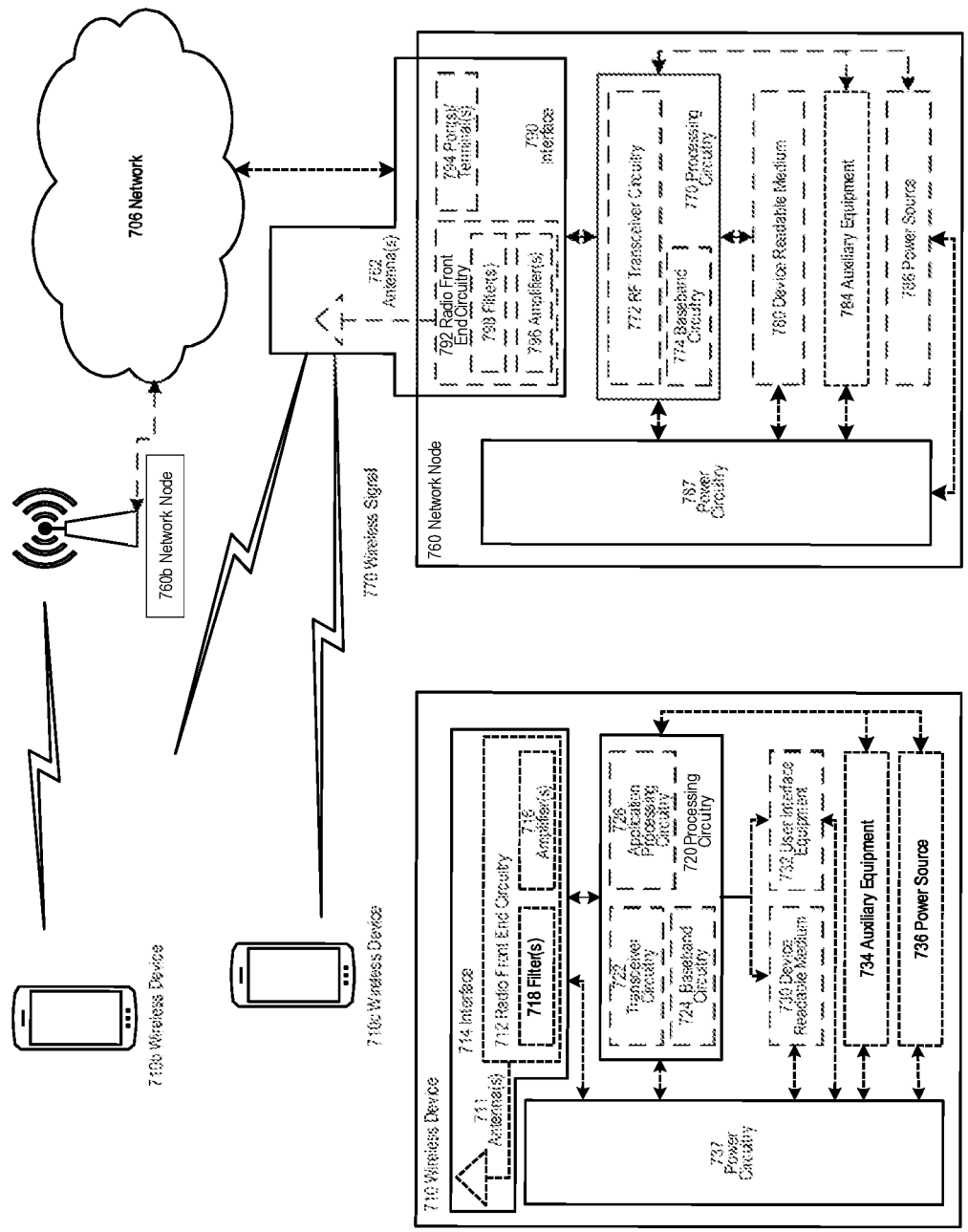
FIG. 7 is a schematic diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760b, and WDs 710, 710b, and 710c. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, WCDMA, LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760, but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signalling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720, and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a WD may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into WD 710, and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network, and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

Figure 8:
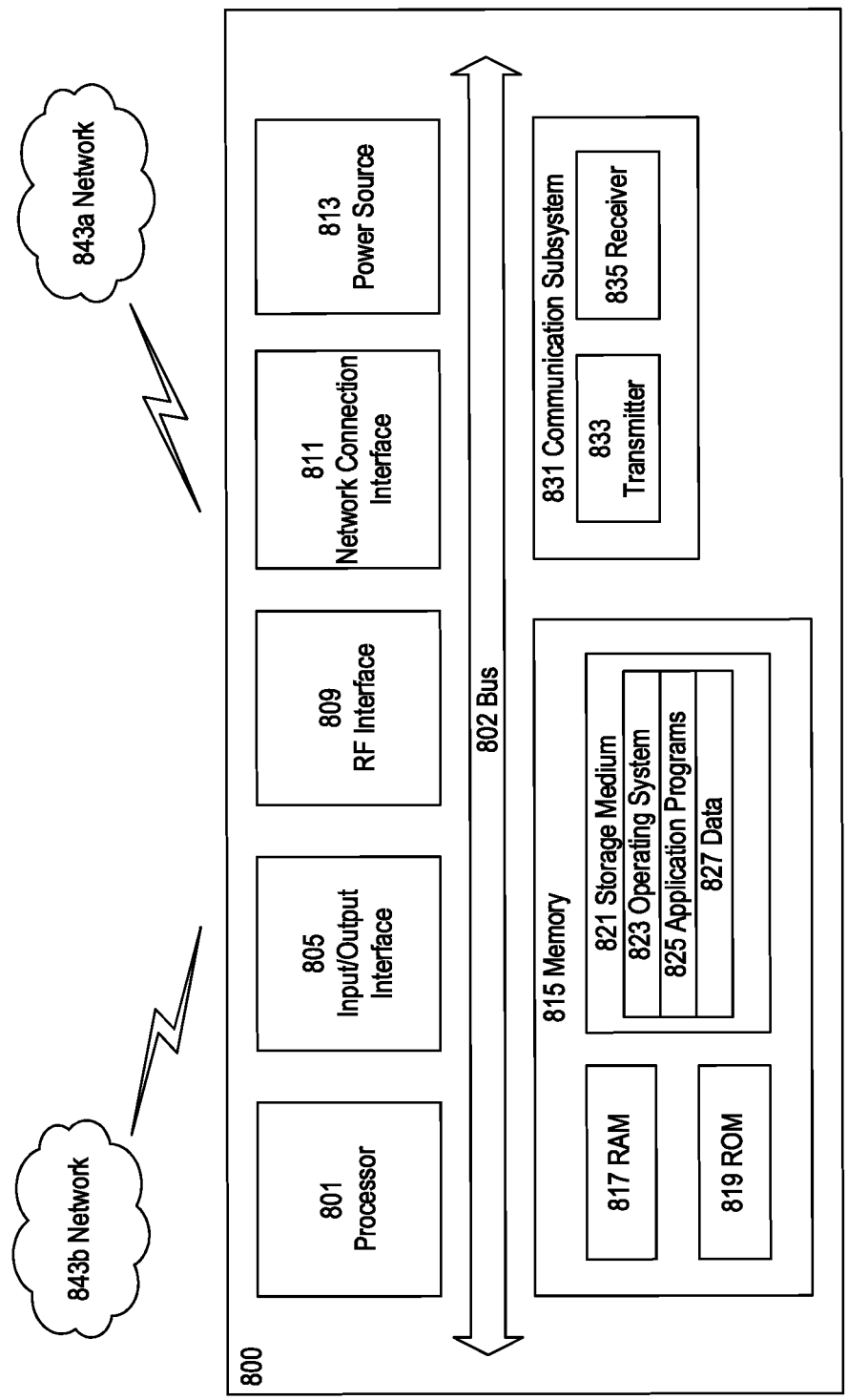
FIG. 8 is a schematic diagram of a user equipment in accordance with some embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 8200 may be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843a. Network 843a may encompass wired and/or wireless networks such as a local-area network (LAN), a wide-area network (WAN), a computer network, a wireless network, a telecommunications network, another like network or any combination thereof. For example, network 843a may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843b using communication subsystem 831. Network 843a and network 843b may be the same network or networks or different network or networks. Communication subsystem 831 may be configured to include one or more transceivers used to communicate with network 843b. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843b may encompass wired and/or wireless networks such as a local-area network (LAN), a wide-area network (WAN), a computer network, a wireless network, a telecommunications network, another like network or any combination thereof. For example, network 843b may be a cellular network, a Wi-Fi network, and/or a near-field network. Power source 813 may be configured to provide alternating current (AC) or direct current (DC) power to components of UE 800.

Figure 9:
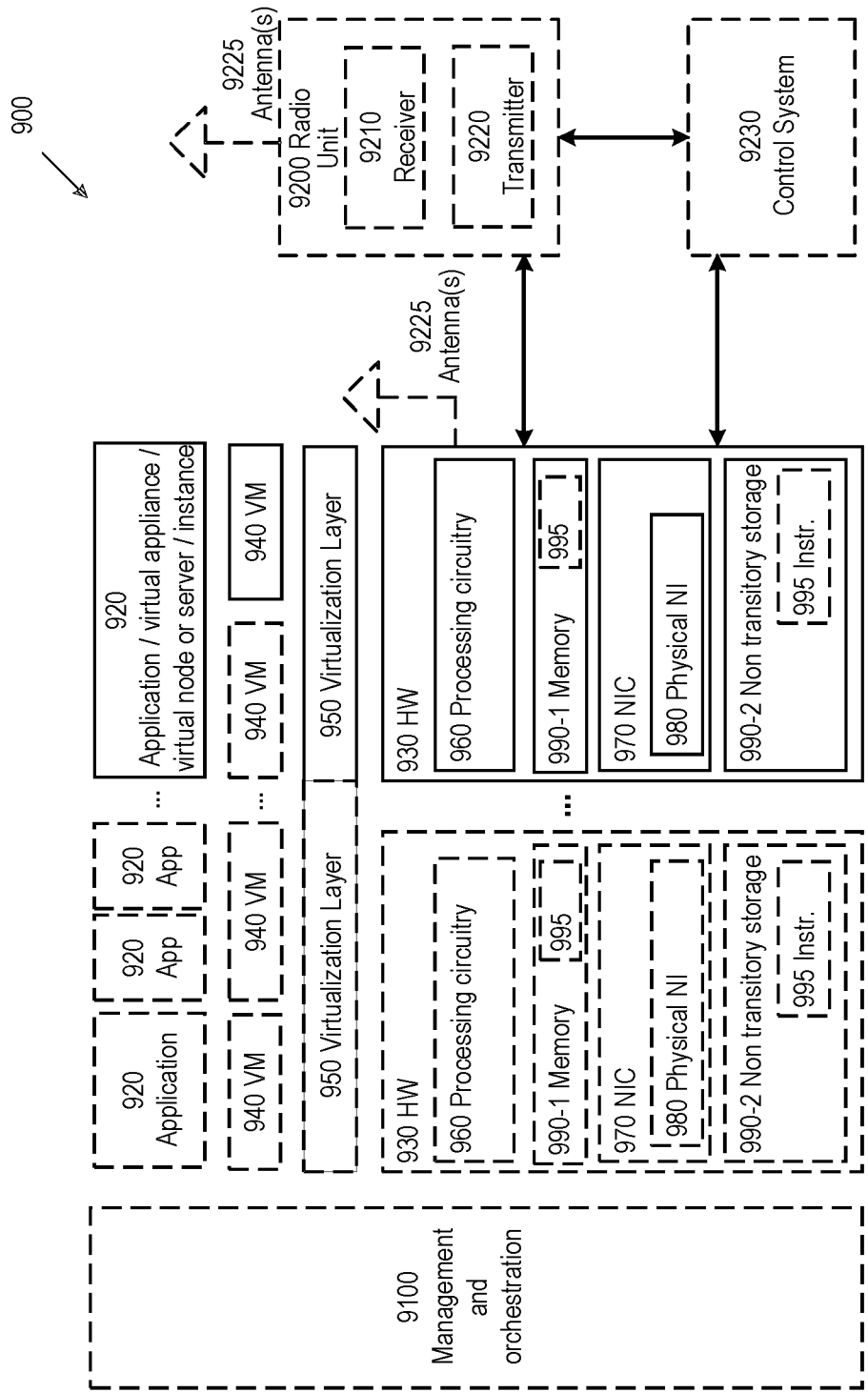
FIG. 9 is a schematic diagram of a virtualization environment in accordance with some embodiments.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signalling can be effected with the use of control system 9230 which may alternatively be used for communication between the hardware nodes 930 and radio units 9200.

Figure 10:
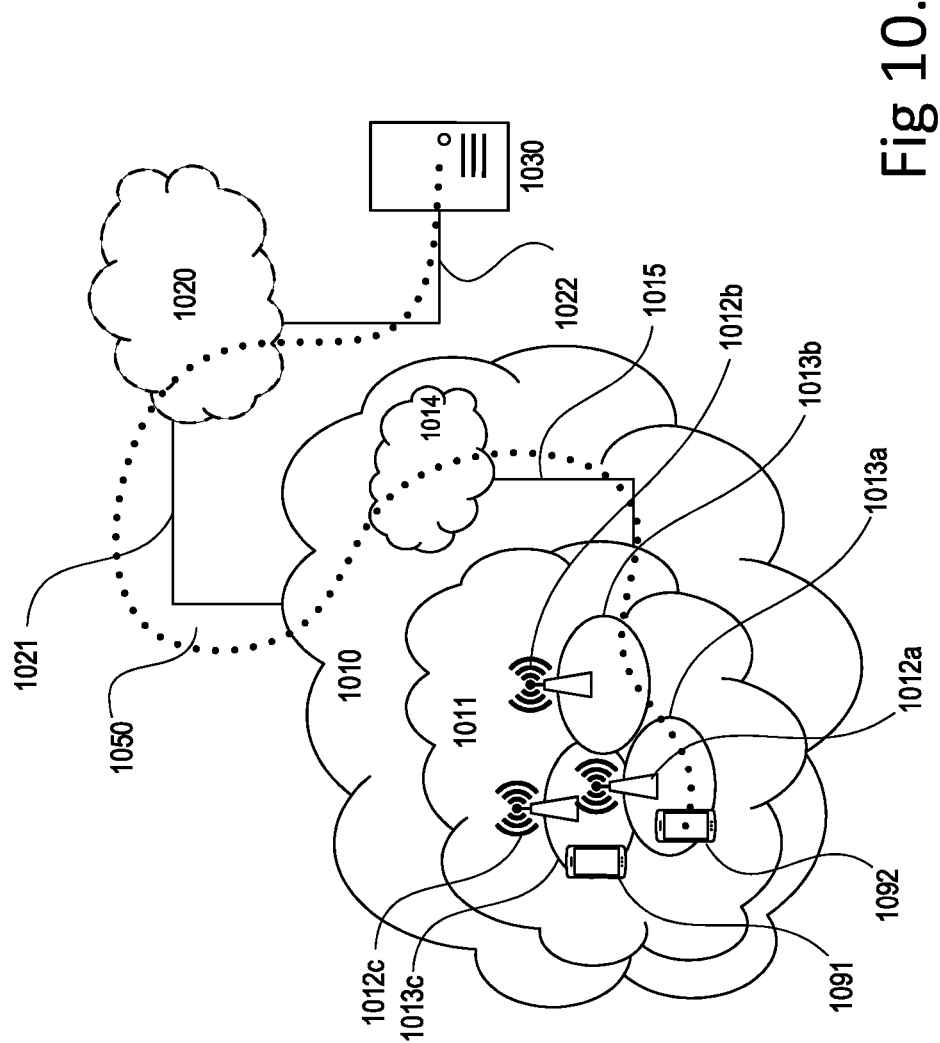
FIG. 10 is a schematic diagram of a telecommunication network connected via an intermediate network to a host computer in accordance with some embodiments.

With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network;

intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 11:
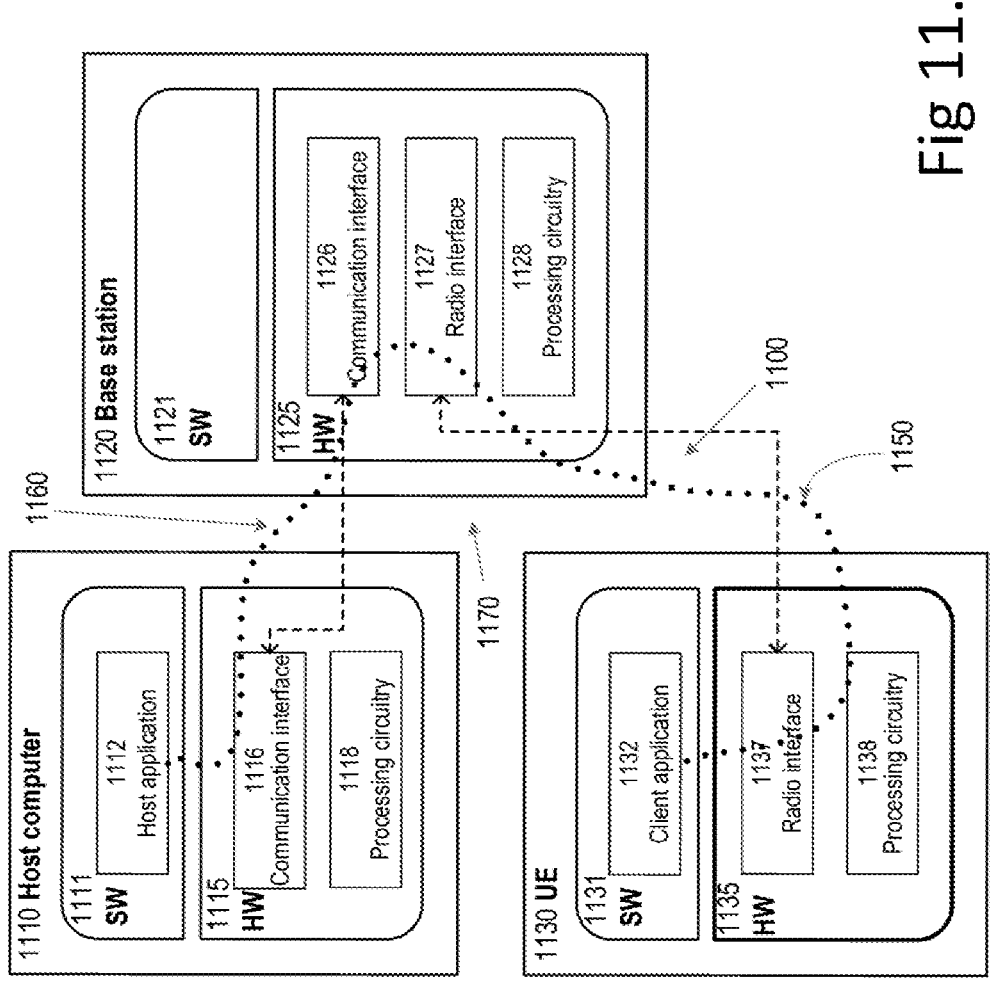
FIG. 11 is a schematic diagram of a host computer communicating via a base station with a user equipment over a partially wireless connection in accordance with some embodiments.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the latency and power consumption and thereby provide benefits such as reduced user waiting time, better responsiveness, and extended battery lifetime.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
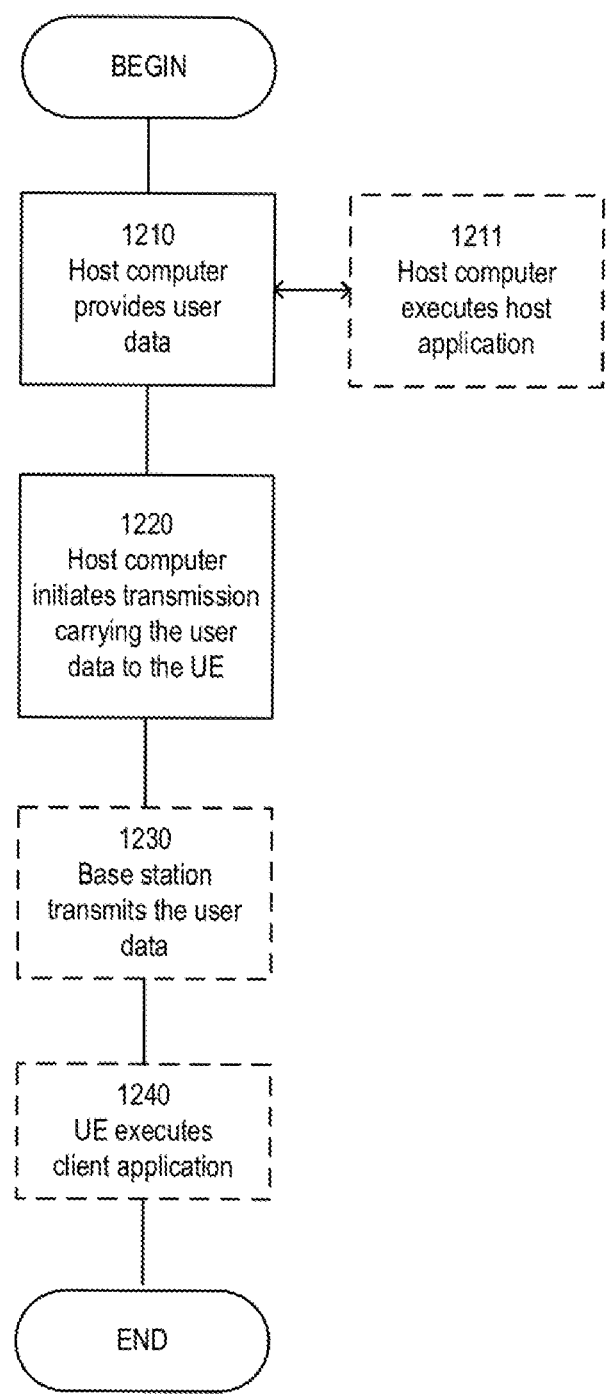
FIG. 12 is a flowchart showing methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
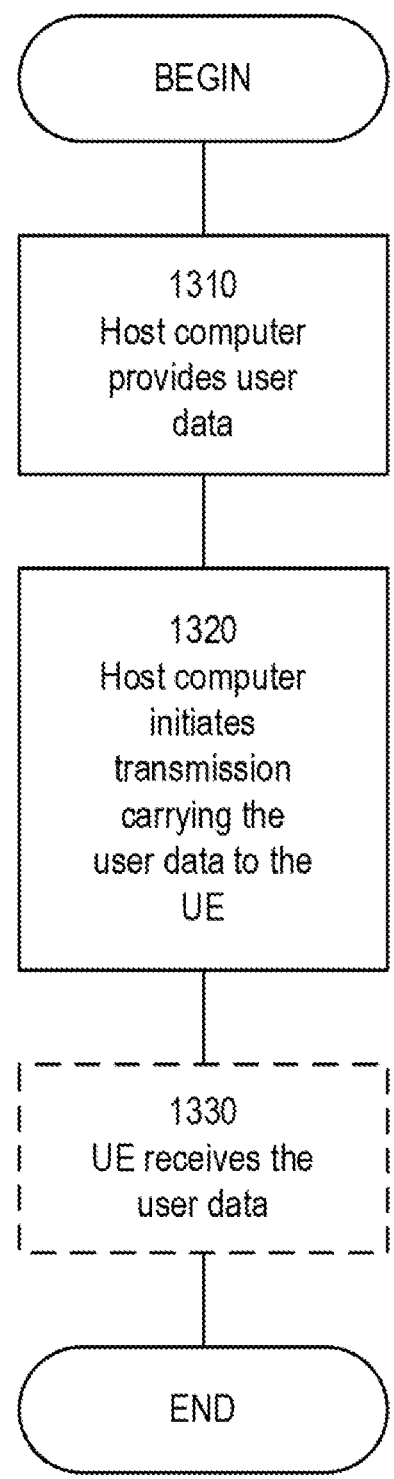
FIG. 13 is a flowchart showing methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
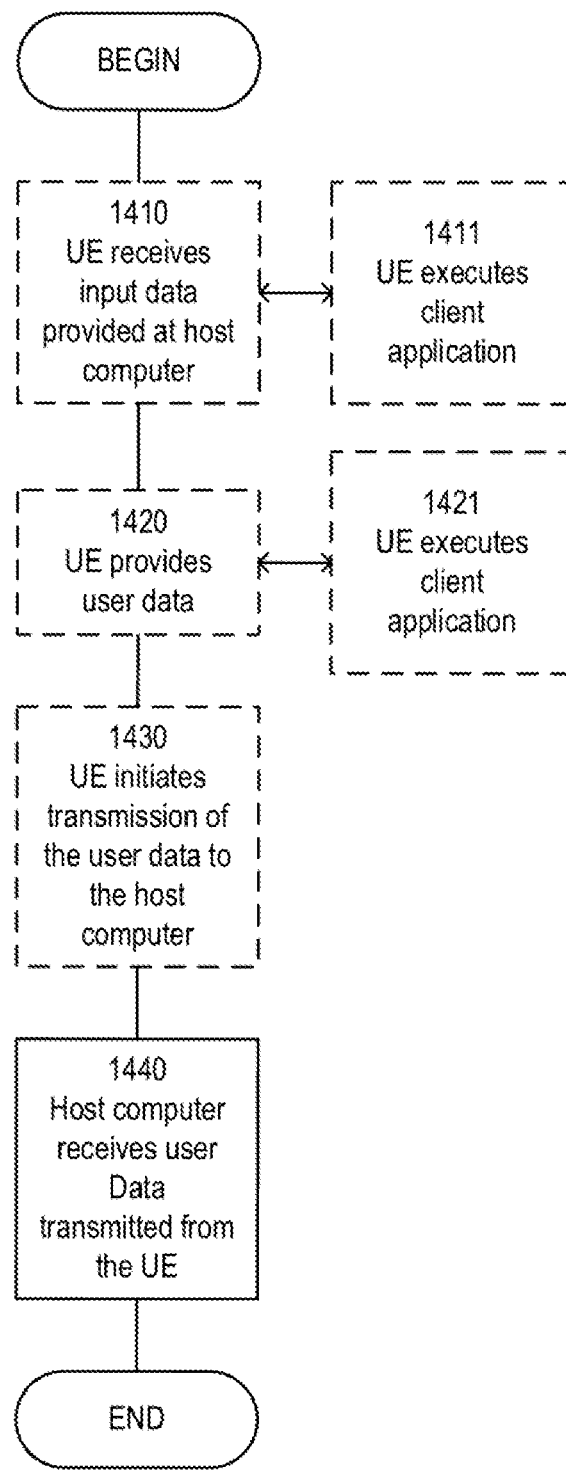
FIG. 14 is a flowchart showing methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
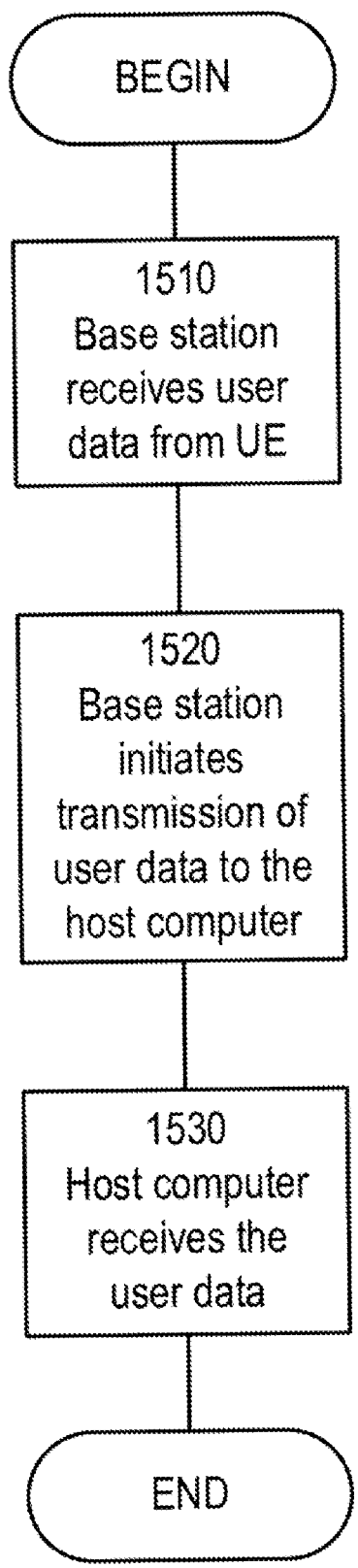
FIG. 15 is a flowchart showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The following numbered statements provide additional information on certain aspects of embodiments:

1. A method performed by a wireless device for reducing RSRP and/or RSRQ measurements, the method comprising:

Determining whether or not to perform cell selection and/or reselection measurements based on certain criteria.

2. The method of statement 1, wherein the criteria comprises one or more non-measurement zones configured by a wireless network.

3. The method of statement 1, wherein the criteria comprises one or more intra-frequency measurement rules.

4. The method of statement 1, wherein the criteria comprises a list of cells identified by a wireless network.

5. The method of statement 1, wherein the criteria comprises a geographical distance between the wireless device and a cell.

6. The method of statement 1, wherein the criteria is indicated by one or more of the following:
   a. RRC;
   b. MAC CE;
   c. RRC and RNTI;
   d. DCI; and
   e. NAS
7. The method of statement 1, wherein the criteria comprises one or more reference locations.
8. The method of any of the previous statements, further comprising:
   providing user data; and
   forwarding the user data to a host computer via the transmission to the base station.
9. A method performed by a base station for reducing RSRP and/or RSRQ measurements, the method comprising:
   Indicating to a wireless device whether or not to perform cell selection and/or reselection measurements based on certain criteria
10. The method of statement 9, wherein the criteria comprises one or more non-measurement zones configured by the base station.
11. The method of statement 9, wherein the criteria comprises one or more intra-frequency measurement rules.
12. The method of statement 9, wherein the criteria comprises a list of cells identified by the base station.
13. The method of statement 9, wherein the criteria comprises a geographical distance between the wireless device and a cell.
14. The method of statement 9, wherein the criteria is indicated by one or more of the following:
   a. RRC;
   b. MAC CE;
   c. RRC and RNTI;
   d. DCI; and
   e. NAS
15. The method of statement 9, wherein the criteria comprises one or more reference locations.
16. The method of any of the previous statement, further comprising:
   obtaining user data; and
   forwarding the user data to a host computer or a wireless device.
17. A wireless device for reducing RSRP and/or RSRQ measurements, the wireless device comprising:
   processing circuitry configured to perform any of the steps of any of statements 1 to 8; and
   power supply circuitry configured to supply power to the wireless device.
18. A base station for reducing RSRP and/or RSRQ measurements, the base station comprising:
   processing circuitry configured to perform any of the steps of any of statements 9 to 16;
   power supply circuitry configured to supply power to the base station.
19. A user equipment (UE) for reducing RSRP and/or RSRQ measurements, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of statements 1 to 8;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.
20. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of statements 9 to 16.
21. The communication system of statement 20 further including the base station.
22. The communication system of any of statements 20 and 21, further including the UE, wherein the UE is configured to communicate with the base station.
23. The communication system of any of statements 20 to 22, wherein:
   the processing circuitry of the host computer is configured to execute a host application, thereby providing the user data; and
   the UE comprises processing circuitry configured to execute a client application associated with the host application.
24. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of statements 9 to 16.
25. The method of statement 24, further comprising, at the base station, transmitting the user data.
26. The method of any of statements 24 and 25, wherein the user data is provided at the host computer by executing a host application, the method further comprising, at the UE, executing a client application associated with the host application.
27. A user equipment (UE) configured to communicate with a base station, the UE comprising a radio interface and processing circuitry configured to perform the method of any of statements 24 to 26.
28. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of statements 1 to 8.
29. The communication system of statement 28, wherein the cellular network further includes a base station configured to communicate with the UE.

30. The communication system of any of statements 28 and 29, wherein:
the processing circuitry of the host computer is configured to execute a host application, thereby providing the user data; and
the UE's processing circuitry is configured to execute a client application associated with the host application.

31. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of statements 1 to 8.

32. The method of statement 31, further comprising at the UE, receiving the user data from the base station.

33. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of statements 1 to 8.

34. The communication system of statement 33, further including the UE.

35. The communication system of any of statements 33 and 34, further including the base station, wherein the base station comprises a radio interface configured to communicate with the UE and a communication interface configured to forward to the host computer the user data carried by a transmission from the UE to the base station.

36. The communication system of any of statements 33 to 35, wherein:
the processing circuitry of the host computer is configured to execute a host application; and
the UE's processing circuitry is configured to execute a client application associated with the host application, thereby providing the user data.

37. The communication system of any of statements 33 to 36, wherein:
the processing circuitry of the host computer is configured to execute a host application, thereby providing request data; and
the UE's processing circuitry is configured to execute a client application associated with the host application, thereby providing the user data in response to the request data.

38. A method implemented in a communication system including a host computer, a base station and a user equipment (UE), the method comprising:
at the host computer, receiving user data transmitted to the base station from the UE, wherein the UE performs any of the steps of any of statements 1 to 8.

39. The method of statement 38, further comprising, at the UE, providing the user data to the base station.

40. The method of any of statements 38 and 39, further comprising:
at the UE, executing a client application, thereby providing the user data to be transmitted; and
at the host computer, executing a host application associated with the client application.

41. The method of any of statements 38 to 40, further comprising:
at the UE, executing a client application; and
at the UE, receiving input data to the client application, the input data being provided at the host computer by executing a host application associated with the client application,
wherein the user data to be transmitted is provided by the client application in response to the input data.

42. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of statements 9 to 16.

43. The communication system of statement 42 further including the base station.

44. The communication system of any of statements 42 and 43, further including the UE, wherein the UE is configured to communicate with the base station.

45. The communication system of any of statements 42 to 44, wherein:
the processing circuitry of the host computer is configured to execute a host application;
the UE is configured to execute a client application associated with the host application, thereby providing the user data to be received by the host computer.

46. A method implemented in a communication system including a host computer, a base station and a user equipment (UE), the method comprising:
at the host computer, receiving, from the base station, user data originating from a transmission which the base station has received from the UE, wherein the UE performs any of the steps of any of statements 1 to 8.

47. The method of statement 46, further comprising at the base station, receiving the user data from the U E.

48. The method of any of statements 46 and 47, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1× Radio Transmission Technology
3GPP 3rd Generation Partnership Project
5G 5th Generation
ABS Almost Blank Subframe
ARQ Automatic Repeat Request
AS Access Stratum
AWGN Additive White Gaussian Noise
BCCH Broadcast Control Channel
BCH Broadcast Channel
BL/CE Bandwidth Limited/Coverage Extended
BS Base Station
CA Carrier Aggregation
CC Carrier Component
CCCH SDU Common Control Channel SDU
CDMA Code Division Multiplexing Access
CGI Cell Global Identifier
CIR Channel Impulse Response CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
GEO Geostationary Orbit
GPS Global Positioning System
GW Gateway
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LEO Low Earth Orbit
LOS Line of Sight
LPP LTE Positioning Protocol
LTE Long-Term Evolution
MAC Medium Access Control
MAC CE Medium Access Control Control Element
MEO Medium Earth Orbit
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NAS Non-Access Stratum
NGSO Non-Geostationary Orbit
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
RTT Round-Trip Time
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SR Scheduling Requests
SS Synchronization Signal
SSS Secondary Synchronization Signal
TA Timing Advance
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for reducing Reference Signal Received Power (RSRP) and/or Reference Signal Received Quality (RSRQ) measurements, the method comprising:
   determining, based on certain criteria indicating one or more non-measurement zones, that a measurement condition is satisfied; and as a result of determining that the measurement condition is satisfied, refraining from performing a cell selection or reselection measurement for at least a first cell, wherein the first cell is a spotbeam generated by a satellite, wherein determining that the measurement condition is satisfied comprises determining that a geographical position of the wireless device is within one of the one or more non-measurement zones.

2. The method of claim 1, wherein the one or more non-measurement zones are defined using one or more reference locations.

3. The method of claim 2, wherein the one or more reference locations are earth fixed.

4. The method of claim 2, wherein the one or more reference locations change with time.

5. The method of claim 2, wherein the reference locations are defined relative to a satellite position.

6. The method of claim 2, wherein the reference locations are defined relative to the satellite spotbeam.

7. The method of claim 2, wherein the criteria comprise one or more intra-frequency measurement rules and/or one or more inter-frequency measurement rules.

8. The method of claim 7, wherein the criteria comprise a geographical distance between the wireless device and a cell, and wherein the intra-frequency measurement rule and/or intra-frequency measurement rule to be applied to a given cell is dependent upon the geographical distance between the wireless device and the given cell.

9. The method of claim 8, wherein different thresholds are used to determine whether or not RSRP and/or RSRQ measurements should be performed for the given cell, based on the geographical distance between the wireless device and the given cell.

10. The method of claim 1, wherein the criteria comprise a list of cells identified by a wireless network.

11. The method of claim 10, wherein a set of cells are selected for RSRP and/or RSRQ measurement activity, and the cells in the set of cells are close in geographical distance to the wireless device.

12. The method of claim 1, wherein the criteria are indicated by one or more of the following:
a Radio Resource Control message;
a Medium Access Control Control Element;
a Radio Network Temporary Identifier;
Downlink Control Information; or
a Non-Access Stratum message.

13. The method of claim 1, wherein the wireless device performs measurements to obtain the geographical position of the wireless device.

14. The method of claim 13, wherein the geographical measurements use Global Navigation Satellite System signals.

15. The method of claim 1, wherein the satellite is a Low Earth Orbit satellite, a Middle Earth Orbit satellite, or a Geostationary Orbit satellite.

16. The method of claim 1, further comprising:
providing user data; and
forwarding the user data to a host computer via a transmission to a base station.

17. A method for reducing Reference Signal Received Power (RSRP) and/or Reference Signal Received Quality (RSRQ) measurements, the method comprising:
a base station indicating to a wireless device whether or not to perform cell selection and/or reselection measurements based on certain criteria, wherein at least one of the cells for which the wireless device may perform cell selection or reselection measurements is a spotbeam generated by a satellite, wherein the criteria comprise one or more intra-frequency measurement rules and/or one or more inter-frequency measurement rules, and the criteria comprise a geographical distance between the wireless device and a cell, and wherein the intra-frequency measurement rule and/or intra-frequency measurement rule to be applied to a given cell is dependent upon the geographical distance between the wireless device and the given cell.

18. The method of claim 17, wherein the criteria comprises one or more non-measurement zones configured by the base station.

19. The method of claim 18, wherein
the one or more non-measurement zones are defined using one or more reference locations, and
i) the one or more reference locations are earth fixed,
ii) the one or more reference locations change with time,
iii) the one or more reference locations are defined relative to a satellite position, or
iv) the reference locations are defined relative to the spotbeam.

20. The method of claim 17, wherein different thresholds are used to determine whether or not RSRP and/or RSRQ measurements should be performed for the given cell, based on the geographical distance between the wireless device and the given cell.

21. The method of claim 17, wherein
the criteria comprise a list of cells identified by the base station,
a set of cells are selected for RSRP and/or RSRQ measurements, and
the cells in the set of cells are close in geographical distance to the wireless device.

22. A wireless device for reducing Reference Signal Received Power (RSRP) and/or Reference Signal Received Quality (RSRQ) measurements, the wireless device comprising:
processing circuitry; and
power supply circuitry configured to supply power to the wireless device, wherein the processing circuitry is configured to cause the wireless device to perform a method comprising:
determining, based on certain criteria indicating one or more non-measurement zones, that a measurement condition is satisfied; and
as a result of determining that the measurement condition is satisfied, refraining from performing a cell selection or reselection measurement for at least a first cell, wherein
the first cell is a spotbeam generated by a satellite, and
determining that the measurement condition is satisfied comprises determining that a geographical position of the wireless device is within one of the one or more non-measurement zones.

23. A base station for reducing Reference Signal Received Power (RSRP) and/or Reference Signal Received Quality (RSRQ) measurements, the base station comprising:
processing circuitry configured to perform the step of indicating to a wireless device whether or not to perform cell selection and/or reselection measurements based on certain criteria; and
power supply circuitry configured to supply power to the base station, wherein the criteria comprise one or more intra-frequency measurement rules and/or one or more inter-frequency measurement rules, and the criteria comprise a geographical distance between the wireless device and a cell, and wherein the intra-frequency measurement rule and/or intra-frequency measurement rule to be applied to a given cell is dependent upon the geographical distance between the wireless device and the given cell.

* * * * *